United States Patent [19]

Nomura et al.

[11] 4,116,402

[45] Sep. 26, 1978

[54] PASSENGER RESTRAINING BELT RETRACTOR

[75] Inventors: Kenichiro Nomura; Mamoru Mori, both of Okazaki; Jun Yasumatsu, Toyota; Tatsushi Kubota, Okazaki; Sadao Hachisuka, Anjo; Kazuhisa Tatematsu, Nagoya, all of Japan

[73] Assignees: Toyota Jidosha Kogyo Kabushiki Kaisha; Kabushiki Kaisha Tokai Rika Denki Seisakusho, both of Japan

[21] Appl. No.: 818,296

[22] Filed: Jul. 25, 1977

[30] Foreign Application Priority Data

Aug. 3, 1976 [JP] Japan .......................... 51-104293[U]

[51] Int. Cl.[2] ...................... A62B 35/02; B65H 75/48
[52] U.S. Cl. .......................... 242/107.1; 242/107.4 R; 280/747

[58] Field of Search ............................ 242/107–107.7; 280/744–747; 297/388

[56] References Cited

U.S. PATENT DOCUMENTS 2,814,504  11/1957  Campbell et al. ............ 242/107.1 X Primary Examiner—Harvey C. Hornsby
Assistant Examiner—John M. Jillions
Attorney, Agent, or Firm—Koda and Androlia

[57] ABSTRACT

A passenger restraining belt retractor for winding up two restraining belts on a single retractor shaft over the other including a base, a retractor shaft rotatably supported by said base for winding up the belts during retraction, a guide, a roller which engages with and presses against the guide one of the belts, the roller being arranged and configured to rotate as the other one of the two belts is extended thereby insuring that both belts are extended simultaneously.

10 Claims, 6 Drawing Figures

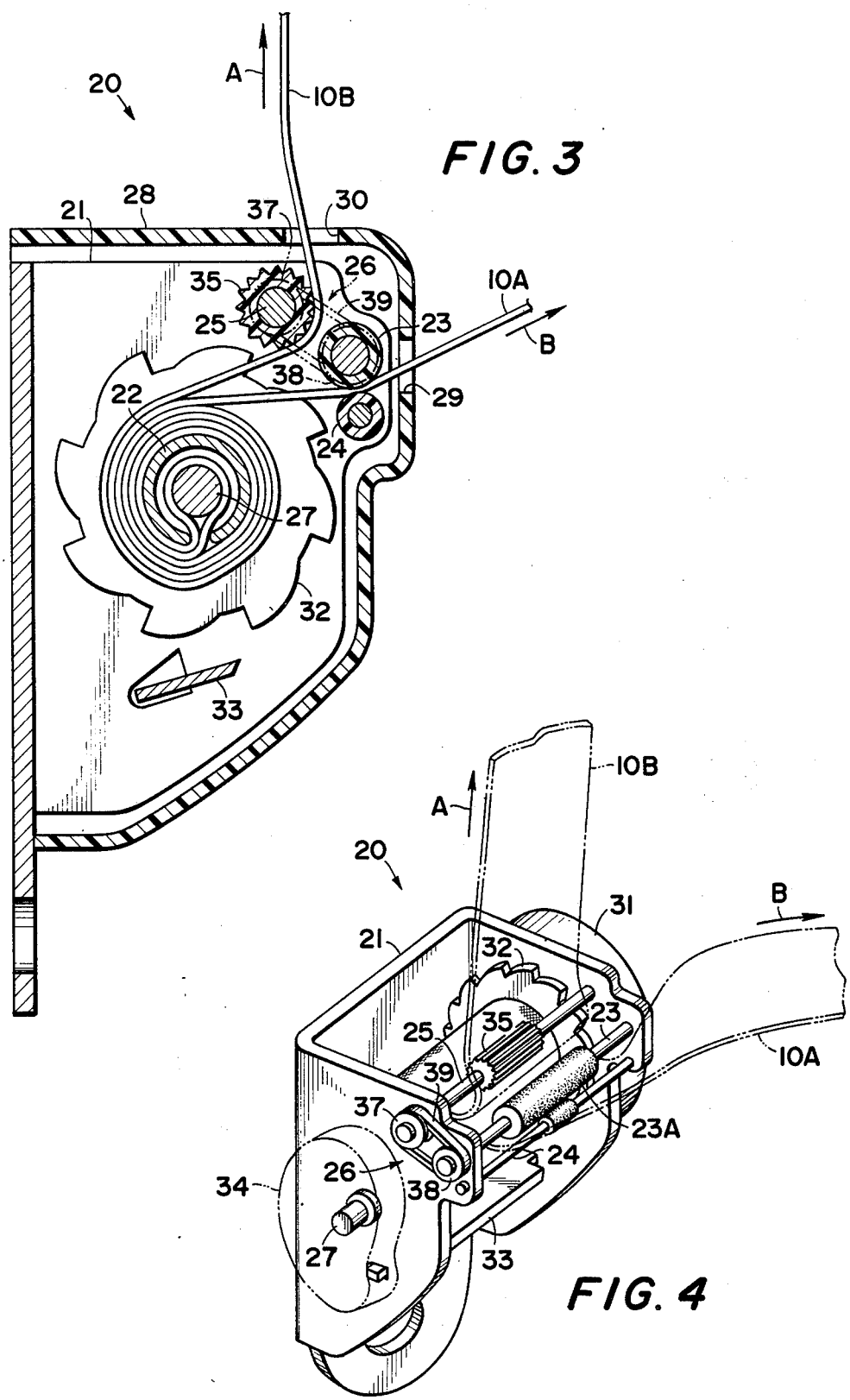

PASSENGER RESTRAINING BELT RETRACTOR

BACKGROUND OF THE INVENTION

1. Field of Invention

This invention relates to passenger restraining belt retractors and more particularly to passenger restraining belt retractors for winding up two belts on a single retractor shaft one over the other.

2. Prior Art

Three point passenger restraining devices consisting of lap and shoulder restraining belts are widely used as restraining systems for the purpose of restraining passengers during vehicle emergencies, such as collisions, etc. In these three point restraining devices, the useability and storeability of the restraining belts is improved by the installation of a retractor system which retracts, by means of an applied force, that portion of the restraining belt not used by the passenger and the majority of both belts when the passenger is not using the restraining belt.

In such three point restraining devices, the installation of a separate restraining belt retractor for each of the lap and shoulder restraining belts is considered to be the most effective method of improving the useability and storeability of the belts. However, a restraining belt retractor system which winds up both restraining belts on a single retractor one over the other without injuring the useability or storeability of the belts has been proposed.

As shown in FIGS. 1 and 2, this two belts retracting type of restraining belt retractor is designed as follows:

The lap restraining belt 10A and the shoulder restraining belt 10B are formed by a single continuous belt which is folded back through an opening 12 and in a tongue plate 11. The lap restraining belt 10A and the shoulder restraining belt 10B, which is folded back through an eye in an anchor 14 fastened to the upper portion of the side wall of the vehicle body 13, are rolled up together on retractor 15.

The retractor 15 is fastened to the lower portion of the side wall of the vehicle body 13 and is designed so that the lap restraining belt 10A and the shoulder restraining belt 10B are rolled up on a powered retractor shaft 16 one over the other. The passenger sitting in the seat 17 puts the three point restraining device into use by engaging the tongue plate 11 with the buckle 18 which is anchored at the approximate center line of the vehicle.

The use of such a two belts retracting type of restraining belt retractor system makes it possible to simultaneously extend both restraining belts by pulling either one of the restraining belts from the retractor 15. Furthermore, since one continuous restraining belt is folded back through the tongue plate 11, it is possible to adjust the relative length of each belt so that the lap restraining belt 10A and the shoulder restraining belt 10B are both constantly maintained at an appropriate length. Accordingly, such a system has offered superior useability and handling in spite of the fact that only a single retractor is employed.

In this two belts retracting type of restraining belt retractor system, when one of the restraining belts is extended, the other restraining belt is also simultaneously extended to the same length. Accordingly, the tension acting upon the other restraining belt which is not pulled is weak so that there is the possibility of this belt becoming slack inside the retractor case (as shown by the broken line in FIG. 2). A restraining belt which has thus become slack inside the retractor case injures the handling characteristics and restraining ability of the system and may interfere with the operation of the emergency locking retractor mechanism which automatically stops the extension of the restraining belt during a vehicle emergency.

This invention has been designed with the aforementioned difficulties in mind.

SUMMARY OF THE INVENTION

Accordingly, it is a general object of the present invention to provide a seat belt retractor for retracting two seat belts which prevents the occurrence of slack within the retractor case.

It is another object of the present invention to provide a seat belt retractor for winding up two seat belts on a single retractor shaft one over the other which is simple, inexpensive to manufacture and reliable.

In keeping with the principles of the present invention, the objects are accomplished by a unique passenger restraining belt retractor for winding up two restraining belts on a single retractor shaft one over the other. The passenger restraining belt retractor includes a base, a retractor shaft rotatably supported by the base for winding up the two belts during retraction, a guide, and a roller which engages with and presses against the guide one of the belts, the roller being arranged and configured to rotate as the other one of the two belts is extended, thereby insuring that both belts are extended simultaneously and equally.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 3 is a cross-section of a seat belt retractor in accordance with the teachings of the present invention;

FIG. 4 is an oblique view of the embodiment of FIG. 3;

DESCRIPTION OF THE INVENTION

Figure 1:
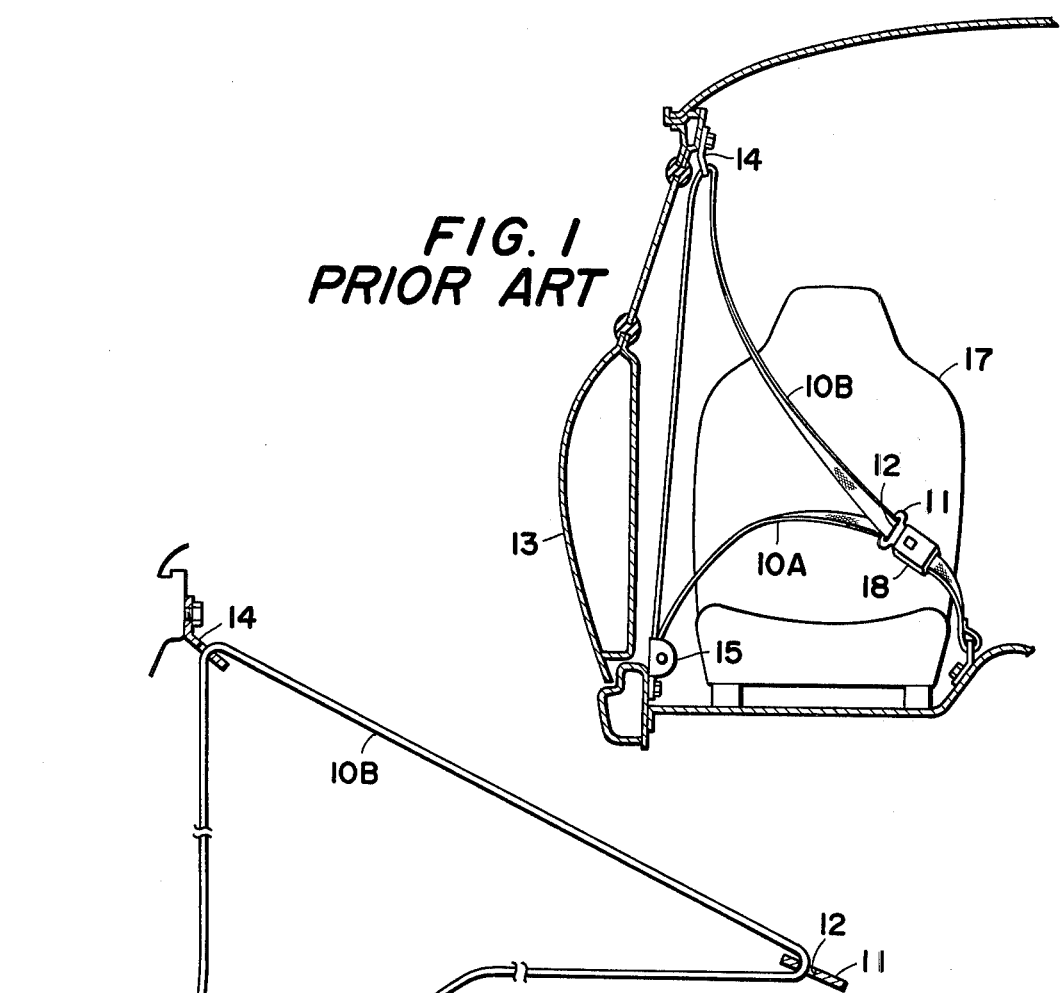
FIG. 1 is a partial cross-sectional view illustrating a conventional passenger restraining device of the prior art.
Figure 2:
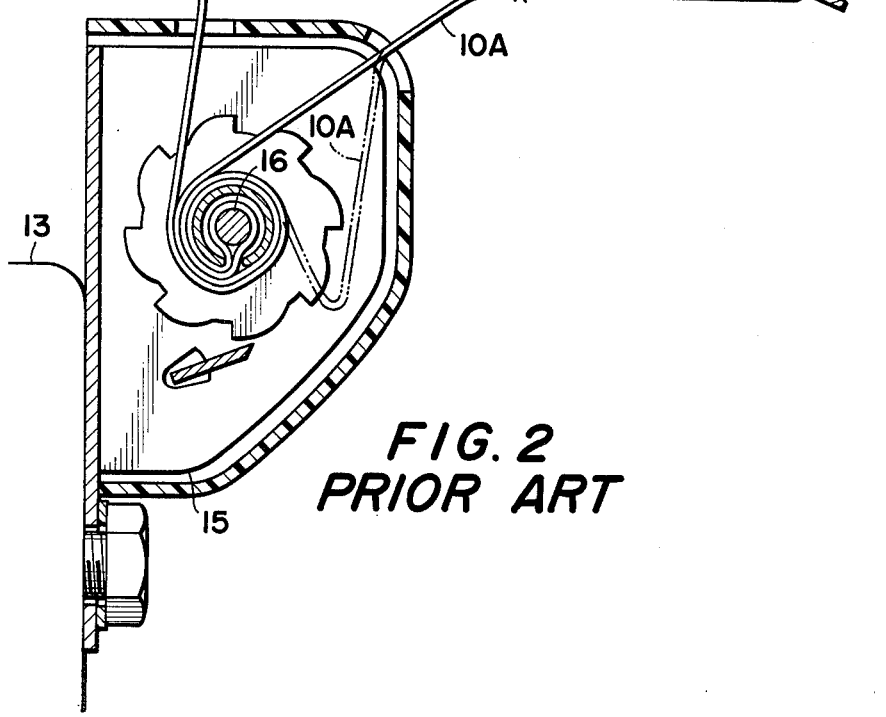
FIG. 2 is a cross-sectional view of a retractor mechanism of the prior art.

Referring more particularly to the drawings, shown in FIGS. 3 and 4 is a passenger restraining belt retractor in accordance with the teachings of the present invention. In FIGS. 3 and 4 the passenger restraining belt retractor 20 consists of a base 21, a retractor shaft 27, a bail roller 23, a guide roller 24, a responding shaft 25 and a transmission mechanism 26. The base 21 is bent into a generally U shape and rotatably supports the retractor shaft 27. A lap restraining belt 10A and a shoulder restraining belt 10B, which are anchored between a sleeve 22 and the retractor shaft 27, are wound up on the retractor shaft 27 one over the other. The lap restraining belt 10A and the shoulder restraining belt 10B pass respectively through openings 29 and 30 in the cover 28 which covers the base 21. The lap restraining belt 10A and the shoulder restraining belt 10B extend out of the cover 28 toward the passenger. In addition, a coil spring 31 is provided between one end of the retractor shaft 27 and the base 21. The retractor shaft 27 is driven in the direction of retraction of the restraining belts 10A and 10B so that both restraining belts are stored when not in use.

A ratchet wheel 32 is fixed to one end of retractor shaft 22. A pawl 33, mounted so that it is free to swing on base 21, is installed so that it can engage and disengage with ratchet wheel 32. During an emergency, the pawl 33 is caused to engage with ratchet wheel 32 by the action of an emergency locking retractor mechanism 34 attached to a near the other end of retractor shaft 22. This automatically and instantly stops the extension of the restraining belts 10A and 10B so that the passenger is securely restrained.

Bail roller 23 is rotatably mounted on base 21. A guide roller 24 is also rotatably mounted in base 21. A gap is formed between the large diameter portion 23A of roller 23 and guide roller 24. The width of this gap is slightly less than the uncompressed thickness of the lap restraining belt 10A. The lap restraining belt 10A, which extends from retractor shaft 27 to the tongue plate 11 via opening 29, is passed through this gap. The lap restraining belt 10A is pressed against the bail roller 23 and the guide roller 24 so that when the bail roller 23 rotates, the restraining belt 10A is moved without slipping on the circumference of the large diameter portion 23A of roller 23.

Shaft 25 is rotatably mounted in base 21. A sleeve 35, with a large number of teeth or projections provided on its circumferential surface, is fixed to the central portion of shaft 25. That portion of the shoulder restraining belt 10B located between retractor shaft 23 and opening 30 is folded around and engages with sleeve 35. Therefore, as shoulder restraining belt 10B moves, the sleeve 35 and the responding shaft 25 are caused to rotate.

Transmission mechanism 26 consists of pulleys 37 and 38 and a continuous belt 39. Pulley 37 is fixed to responding shaft 25 and pulley 38 is fixed to bail roller 23. Belt 39 is mounted on pulleys 37 and 38 so that rotation of responding shaft 25 is transmitted to bail roller 23.

In practice it is desirable that the roller 23, the guide roller 24 and the sleeve 35 be made of a material which produces a strong frictional force with the restraining belts. Such materials include rubber, etc.

In operation, when shoulder restraining belt 10B is taken out of retractor case 28 and pulled towards the passenger (as indicated by the arrow A), the resulting rotation of the sleeve 35 and responding shaft 25 is transmitted to bail roller 23 via belt 39 so that the lap restraining belt 10A pressed between the bail roller 23 and the guide roller 24 is simultaneously extended (as indicated by arrow B) from the retractor shaft 27. The diameters of the sleeve 35, pulleys 37 and 38 and the large diameter portion 23A of bail roller 23 are each adjusted so that both restraining belts 10A and 10B will be extended exactly the same amount from retractor shaft 22.

It should be pointed out that the first embodiment of this invention is designed such that the passenger extends the shoulder restraining belt 10B in order to put the restraining belt into use. However, even though the principal tension caused by the passenger's extension of the belts placed upon the shoulder restraining belt 10B, the lap restraining belt 10A will also be extended exactly the same amount. Accordingly, there is no danger that the lap restraining belt 10A will become slack inside the retractor case 28. Thus, the prior danger that a slackened belt might interfere with the action of paw 33, etc., is eliminated. In this embodiment, the retracting force of the retractor shaft 27 is weakened only by the amount which corresponds to the pressing force with which the lap restraining belt 10A is pressed between the roller 23 and the guide roller 24. It is therefore desirable to strengthen the force of the coil spring 31 by a suitable amount. Furthermore, although in the above described embodiment the lap restraining belt 10A is caused to move by the movement of the shoulder restraining belt 10B, it is clear that the system could also be designed so that the reverse could be true. In addition, it would also be possible to cause the guide roller 24 to rotate in the same manner as the bail roller 23 and is necessary to install other guide rollers in order to insure smooth motion of the restraining belts 10A and 10B toward the openings 29 and 30 provided in the cover 38.

Figure 5:
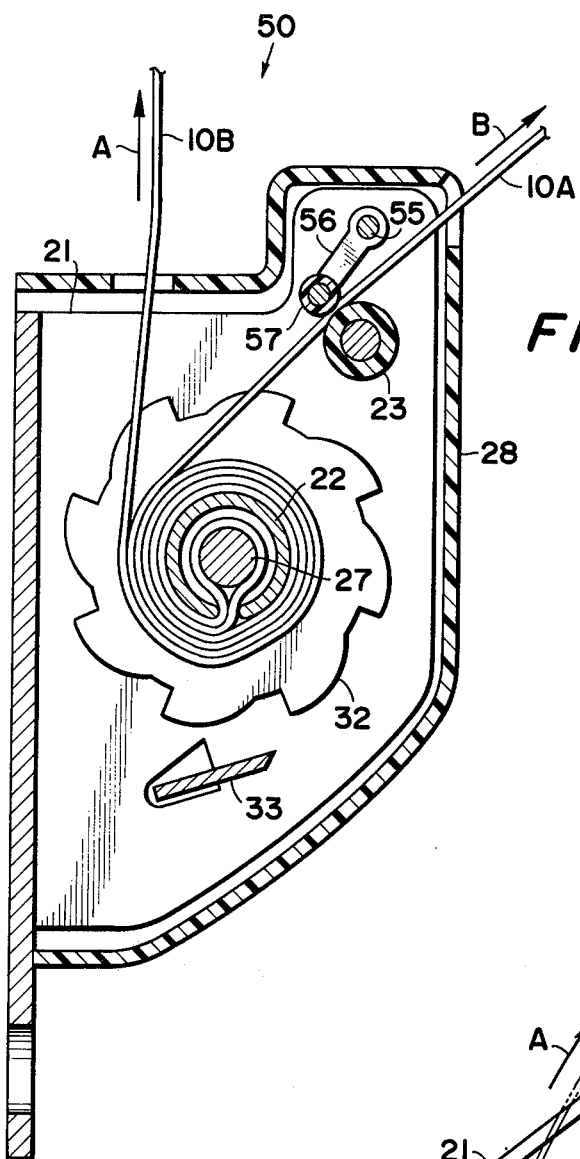
FIG. 5 is a cross-sectional view of a second embodiment of a seat belt retractor in accordance with the teachings of the present invention.
Figure 6:
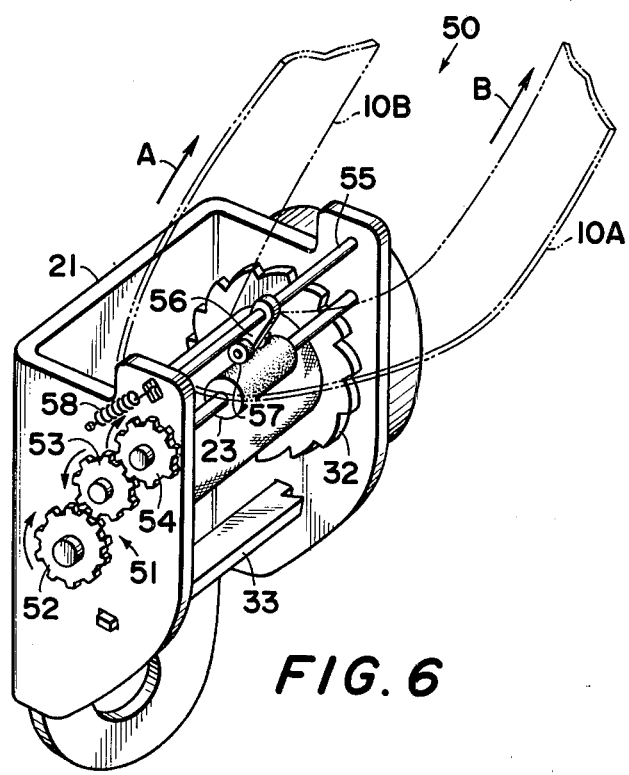
FIG. 6 is an oblique view of the embodiment of FIG. 5.

Referring to FIGS. 5 and 6, shown therein is a second embodiment of a passenger restraining belt retractor in accordance with the teachings of the present invention. Since the embodiment of FIGS. 5 and 6 is similar to that shown and described previously, like elements are given like reference numerals and a description of their interconnection and operation is omitted.

In the passenger restraining belt retractor 50 of FIGS. 5 and 6, the transmission mechanism 51 consists of gears 52, 53 and 54 and the responding shaft 25 of the previous embodiment is omitted. Gear 52 is fastened to one end of retractor shaft 27. Gear 54 is fixed to one end of roller 23. Gear 53 is an idler gear which transmits the rotation of gear 52 to gear 54. The gears 52 and 54 can rotate in either direction. In addition, a guide shaft 55 is pivotally mounted on base 21 adjacent roller 23. A guide roller 57 is rotatably mounted on one end of the tip of guide arm 56 which is fixed to guide shaft 55. Guide roller 57 is pressed against the lap restraining belt 10A and the roller 23 by the force of a spring 58 provided between the base 21 and one end of guide shaft 55.

In operation, when the shoulder restraining belt 10B is extended from retractor shaft 27, the rotation of retractor shaft 27 is transmitted to roller 23 so that the lap restraining belt 10A pressed between the roller 23 and the guide roller 57 is also extended an appropriate amount from the retractor case 28. Accordingly, there is no danger of a slack occurring in the lap restraining belt 10A. Furthermore, since in this embodiment the transmission mechanism 51 is designed so that the rotation of the retractor shaft 27 is transmitted to the roller 23, the rotation of the roller 23 will gradually increase in speed even if the shoulder restraining belt 10B is extended from the retractor shaft 27 at a uniform rate. This arises from the fact that the amount of belt rolled up on the retractor shaft 27 changes as the belts are extended. Therefore, it is necessary to cause slippage between the roller 23 and the lap restraining belt 10A. In order to cause this slippage the guide arm 56 is caused to swing, as necessary, against the force of spring 58 so that the grip of the guide roller 57 and the roller 23 on the belt 10A is sufficiently weakened to solve the problem.

Furthermore, the position of guide roller 57 relative to roller 23 should be established so that when the lap restraining belt 10A is extended from the retractor shaft 27, the guide roller 57 will be pressed more strongly against the roller 23 as the lap restraining belt 10A is moved and so that when the lap restraining belt 10A is retracted by the retractor shaft 27, the reverse will be true and the retraction of the lap restraining belt 10A not hampered.

It should be apparent that in those cases where the engaging tension is placed principally upon the lap restraining belt 10A, the effect described above may be obtained by pressing the shoulder restraining belt 10A between the roller 23 and the guide roller 57.

As described above, the passenger restraining belt retractor in accordance with the teachings of the present invention causes one belt to be positively drawn out of the retractor case by a roller when the other belt is extended. Accordingly, this invention has the superior effect of eliminating any danger of slack in the restraining belt inside the retractor case even when a two belts retractor type of restraining belt retractor system is employed.

In all cases it is understood that the above described embodiments are merely illustrative of but a few of the many possible specific embodiments which represent the applications of the principles of the present invention. Numerous and varied other arrangements can be readily devised by those skilled in the art in accordance with those principles without departing from the spirit and scope of the invention.

We claim:

1. A passenger restraining belt retractor for winding up two restraining belts, on a single retractor shaft one over the other comprising:
   a base;
   a retractor shaft rotatably supported by said base;
   two restraining belts wound up on said retractor shaft one over the other;
   a guide adjacent one of said belts;
   a first roller, said roller engaging with and pressing against said guide one of said belts; and
   a transmission means for causing said roller to rotate as the other one of said two belts is extended thereby insuring that both belts are extended equally.

2. A retractor according to claim 1 wherein said transmission means comprises a first gear fixed to said retractor shaft, a second gear coupled to said first roller and an idler gear meshing with both said first and second gears.

3. A retractor according to claim 1 wherein said guide comprises a guide roller.

4. A retractor according to claim 3 wherein said first and second rollers are made from a material having a high coefficient of friction.

5. A retractor according to claim 1 wherein said guide comprises:
   a guide shaft rotatably supported by said base;
   a guide arm fixed to said guide shaft; and
   a guide roller rotatably mounted on one end of the tip of said guide arm.

6. A retractor according to claim 5 further comprises:
   a spring provided between said base and one end of said guide shaft whereby said guide roller is pressed against one of said two restraining belts and said first roller.

7. A retractor according to claim 4 wherein said second roller has teeth formed on its circumference.

8. A retractor according to claim 1 wherein said transmission means comprises a second roller engaging with said other one of said two seat belts, a first pulley coupled to said second roller, a second pulley coupled to said first roller and an endless belt coupling said first and second pulleys together.

9. A passenger restraining belt retractor for winding up two restraining belts on a single retractor shaft one over the other, comprising:
   a base;
   a retractor shaft rotatably supported by said base;
   two restraining belts would up on said retractor shaft one over the other,
   a guide including a guide roller pressing against one of said two belts;
   a first roller pressing against and guiding said one of said two belts together with said guide roller;
   a first gear fixed to said retractor shaft;
   a second gear coupled to said first roller; and
   an idler gear meshing with both first and second gears.

10. A retractor according to claim 9 wherein said first and guide rollers are made from a material having a high coefficient of friction.

* * * * *